US008321217B2

(12) United States Patent
Sehlstedt

(10) Patent No.: US 8,321,217 B2
(45) Date of Patent: Nov. 27, 2012

(54) VOICE ACTIVITY DETECTOR

(75) Inventor: Martin Sehlstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 546 days.

(21) Appl. No.: 12/601,253

(22) PCT Filed: Apr. 18, 2008

(86) PCT No.: PCT/SE2008/000285
§ 371 (c)(1), (2), (4) Date: Nov. 20, 2009

(87) PCT Pub. No.: WO2008/143569
PCT Pub. Date: Nov. 27, 2008

(65) Prior Publication Data

US 2010/0211385 A1 Aug. 19, 2010

Related U.S. Application Data

(60) Provisional application No. 60/939,437, filed on May 22, 2007.

(51) Int. Cl.
*G10L 15/20* (2006.01)

(52) U.S. Cl. ........................................ 704/233; 704/208

(58) Field of Classification Search .......... 704/205–214, 704/233
See application file for complete search history.

(56) References Cited

U.S. PATENT DOCUMENTS

| | | | | |
|---|---|---|---|---|
| 6,823,303 | B1 * | 11/2004 | Su et al. | 704/220 |
| 8,204,754 | B2 * | 6/2012 | Sehlstedt | 704/500 |
| 2004/0210436 | A1 | 10/2004 | Jiang et al. | |
| 2007/0021958 | A1 * | 1/2007 | Visser et al. | 704/226 |

FOREIGN PATENT DOCUMENTS

WO WO 02065457 A2 8/2002

OTHER PUBLICATIONS

Antti Vahatalo et al "Voice activity detection for GSM adaptive multi-rate codec", Speech Coding Proceedings, 1999 IEEE Workshop on pp. 55-57, 1999 ISBN 978-0-7803-5651-1.

* cited by examiner

*Primary Examiner* — Abul Azad

(57) ABSTRACT

The present invention relates to a voice activity detector (VAD) comprising at least a first primary voice detector. The voice activity detector is configured to output a speech decision 'vad_flag' indicative of the presence of speech in an input signal based on at least a primary speech decision 'vad_prim_A' produced by said first primary voice detector. The voice activity detector further comprises a short term activity detector and the voice activity detector is further configured to produce a music decision 'vad_music' indicative of the presence of music in the input signal based on a short term primary activity signal αvad_act_prim_A' produced by said short term activity detector based on the primary speech decision 'vad_prim_A' produced by the first voice detector. The short term primary activity signal 'vad_act_prim_A' is proportional to the presence of music in the input signal. The invention also relates to a node, e.g. a terminal, in a communication system comprising such a VAD.

18 Claims, 4 Drawing Sheets

| VADL | | DTX Activity (%) | | DTX Activity (%) 20 dB SNR | | DTX Activity (%) 10dB SNR | |
|---|---|---|---|---|---|---|---|
| | | VADR | VADL | VADR | VADL | VADR | VADL |
| Speech | american_all | 62,81 | 63,91 | 66,86 | 66,48 | 65,74 | 65,07 |
| | chinese_all | 58,63 | 60,07 | 62,08 | 61,68 | 60,71 | 59,53 |
| | english_all | 61,64 | 62,61 | 65,24 | 64,82 | 63,92 | 63,27 |
| | german_all | 71,59 | 72,44 | 74,73 | 74,03 | 73,45 | 72,33 |
| | swedish_all | 43,92 | 45,05 | 48,05 | 47,55 | 47,34 | 46,96 |

| | | DTX Activity (%) DSM MSIN | | DTX Activity (%) MSIN | | | VADL-VADR | |
|---|---|---|---|---|---|---|---|---|
| | | VADR | VADL | VADR | VADL | | DSM MSIN | MSIN |
| Babble | Babble1_k700_nfreeb | 70,00 | 12,52 | 74,25 | 69,63 | | -57,48 | -4,62 |
| | Babble2_k700b | 32,28 | 5,31 | 29,73 | 5,82 | | -26,97 | -23,91 |
| | Babble3_NTTb | 28,02 | 3,32 | 30,79 | 3,08 | | -24,70 | -27,71 |
| | Babble4_wd71b | 81,41 | 15,52 | 82,72 | 14,53 | | -65,89 | -68,19 |
| | Babble5_NTTb | 59,64 | 9,58 | 59,26 | 9,53 | | -50,06 | -49,73 |
| | BabbleSecondaryTalker_k700_b | 87,78 | 41,08 | 88,67 | 38,83 | | -46,70 | -49,84 |
| | babble71b | 79,00 | 17,09 | 78,16 | 14,30 | | -61,91 | -63,86 |
| Syn. Babble | babble_32 | 98,93 | 13,57 | 98,20 | 78,93 | | -85,36 | -19,27 |
| | babble_64 | 44,20 | 2,57 | 35,57 | 2,50 | | -41,63 | -33,07 |
| | babble_128 | 12,40 | 2,57 | 10,63 | 2,37 | | -9,83 | -8,26 |
| Music | delerio_mind | 98,56 | 99,13 | 98,77 | 99,14 | | 0,57 | 0,37 |
| | macho_polska | 94,88 | 93,05 | 94,29 | 93,56 | | -1,83 | -0,73 |
| | mi_tierra | 99,08 | 99,29 | 98,96 | 99,35 | | 0,21 | 0,39 |
| | nina_linda | 99,12 | 99,21 | 99,15 | 99,22 | | 0,09 | 0,07 |
| | nothing_else_matters | 93,18 | 97,61 | 92,75 | 97,75 | | 4,43 | 5,00 |
| | of_course_i_am_lying | 91,34 | 98,60 | 86,37 | 84,09 | | 7,26 | -2,28 |
| | orinoco_flow | 94,22 | 94,45 | 93,33 | 87,16 | | 0,23 | -6,17 |
| | para_estar_contigo | 98,40 | 98,89 | 98,35 | 98,89 | | 0,49 | 0,54 |
| | primitive_man | 97,24 | 96,19 | 96,66 | 95,87 | | -1,05 | -0,79 |
| | solo_palabras | 98,94 | 99,07 | 98,89 | 99,09 | | 0,13 | 0,20 |
| Car | BENZ_1 | 1,94 | 0,90 | 1,57 | 0,79 | | -1,04 | -0,78 |
| | BENZ_2 | 3,88 | 0,90 | 2,36 | 0,88 | | -2,98 | -1,48 |
| | BENZ_3 | 9,06 | 1,30 | 5,06 | 1,30 | | -7,76 | -3.76 |
| | BENZ_4 | 11,53 | 1,28 | 9,24 | 1,21 | | -10,25 | -8,03 |
| | wd55 | 3,33 | 2,23 | 3,27 | 2,23 | | -1,10 | -1,03 |
| | wd56 | 27,06 | 10,50 | 26,09 | 10,90 | | -16,56 | -15,19 |
| | wd57 | 7,03 | 3,53 | 6,03 | 3,60 | | -3,50 | -2,43 |
| | wd58 | 4,03 | 2,50 | 3,83 | 2,57 | | -1,53 | -1,27 |
| | wd59 | 48,72 | 11,46 | 47,55 | 7,43 | | -37,26 | -40.12 |
| White | white_norm | 1,63 | 0,77 | | | | -0,86 | 0,00 |

Fig. 4a

VOICE ACTIVITY DETECTOR

This application claims the benefit of U.S. Provisional Application No. 60/939,437, filed May 22, 2007, the disclosure of which is fully incorporated herein by reference.

TECHNICAL FIELD

The present invention relates to an improved Voice Activity Detector (VAD) for music conditions, including background noise update and hangover addition. The present invention also relates to a system including an improved VAD.

BACKGROUND

In speech coding systems used for conversational speech it is common to use discontinuous transmission (DTX) to increase the efficiency of the encoding (reduce the bit rate). The reason is that conversational speech contains large amounts of pauses embedded in the speech, e.g. while one person is talking the other one is listening. So with discontinuous transmission (DTX) the speech encoder is only active about 50 percent of the time on average and the rest is encoded using comfort noise. One example of a codec that can be used in DTX mode is the AMR codec, described in reference [1].

For important quality DTX operation, i.e. without degraded speech quality, it is important to detect the periods of speech in the input signal which is done by the Voice Activity Detector (VAD). With increasing use of rich media it is also important that the VAD detects music signals so that they are not replaced by comfort noise since this has a negative effect on the end user quality. FIG. 1 shows an overview block diagram of a generalized VAD according to prior art, which takes the input signal (divided into data frames, 10-30 ms depending on the implementation) as input and produces VAD decisions as output (one decision for each frame).

FIG. 1 illustrates the major functions of a generalized prior art VAD 10 which consists of: a feature extractor 11, a background estimator 12, a primary voice detector 13, a hangover addition block 14, and an operation controller 15. While different VAD use different features and strategies for estimation of the background, the basic operation is still the same.

The primary decision "vad_prim" is made by the primary voice detector 13 and is basically only a comparison of the feature for the current frame (extracted in the feature extractor 11), and the background feature (estimated from previous input frames in the background estimator 12). A difference larger than a threshold causes an active primary decision "vad_prim". The hangover addition block 14 is used to extend the primary decision based on past primary decisions to form the final decision "vad_flag". This is mainly done to reduce/remove the risk of mid speech and back end clipping of speech bursts. However, it is also used to avoid clipping in music passages, as described in references [1], [2] and [3]. As indicated in FIG. 1, an operation controller 15 may adjust the threshold for the primary detector 13 and the length of the hangover addition according to the characteristics of the input signal.

As indicated in FIG. 1, another important functional part of the VAD 10 is the estimation of the background feature in the background estimator 12. This may be done by two basically different principles, either by using the primary decision "vad_prim", i.e. with decision feed-back; or by using some other characteristics of the input signal, i.e. without decision feed-back. To some degree it is also possible to combine the two principals.

Below is a brief description of different VAD's and there related problem.

AMR VAD1

The AMR VAD1 is described in TS26.094, reference [1], and variation are described in reference [2].

Summary of basic operation, for more details see reference [1].

Feature: Summing of subband SNRs

Background: Background estimate adaptation based on previous decisions

Control: Threshold adaptation based on input noise level

Other: Deadlock recovery analysis for step increases in noise level based on stationarity estimation. High frequency correlation to detect music/complex signals and allow for extended hangover for such signals.

The major problem with this solution is that for some complex backgrounds (e.g. babble and especially for high input levels) causes a significant amount of excessive activity. The result is a drop in the DTX efficiency gain, and the associated system performance.

The use of decision feedback for background estimation also makes it difficult to change detector sensitivity. Since, even small changes in the sensitivity will have an effect on background estimation which may have a significant effect on future activity decisions. While it is the threshold adaptation based on input noise level that causes the level sensitivity it is desirable to keep the adaptation since it improves performance for detecting speech in low SNR stationary noise.

While the solution also includes a music detector which works for most of the cases, it has been identified music segments which are missed by the detector and therefore cause significant degradation of the subjective quality of the decoded (music) signal, i.e. segments are replaced by comfort noise.

EVRC VAD

The EVRC VAD is described in references [4] and [5] as EVRC RDA.

The main technologies used are:

Feature: Split band analysis, (with worst case band is used for rate selection in a variable rate speech codec.

Background: Decision based increase with instant drop to input level.

Control: Adaptive Noise hangover addition principle is used to reduce primary detector mistakes. Hong et al describes noise hangover adaptation in reference [6].

Existing split band solution EVRC VAD has occasional bad decisions which reduced the reliability of detecting speech and shows a too low frequency resolution which affects the reliability to detect music.

Voice Activity Detection by Freeman/Barret

Freeman, see reference [7], discloses a VAD Detector with independent noise spectrum estimation.

Barrett, see reference [8], discloses a tone detector mechanism that does not mistakenly characterize low frequency car noise for signaling tones.

Existing solutions based on Freeman/Barret occasionally show too low sensitivity (e.g. for background music).

AMR VAD2

The AMR VAD2 is described in TS26.094, reference [1].

Technology:

Feature: Summing of FFT based subband SNRs detector

Background: Background estimate adaptation based on previous decisions

Control: Threshold adaptation based on input signal level and adaptive noise hangover.

As this solution is similar to the AMR VAD1 they also share the same type of problems.

SUMMARY OF THE INVENTION

An object with the present invention is to provide a voice activity detector with an improved ability to detect music conditions compared to prior art voice activity detectors.

This object is achieved by a voice activity detector comprising at least a first primary voice detector and a short term activity detector. The first primary voice detector is configured to produce a signal indicative of the presence of speech in an input signal, and the short term activity detector is configured to produce a signal indicative of the presence of music in the input signal based on the signal produced by the first primary voice detector.

An advantage with the present invention is that the risk of speech clipping is reduced compared to prior art voice activity detectors.

Another advantage with the present invention is that a significant improvement in activity for babble noise input, and car noise input, is achieved compared to prior art voice activity detectors.

Further objects and advantages may be found by a skilled person in the art from the detailed description.

BRIEF DESCRIPTION OF DRAWINGS

The invention will be described in connection with the following drawings that are provided as non-limited examples, in which:

FIG. 4*a* shows a summary of the result of the performance of the different codecs for different input signals.

ABBREVIATIONS

AMR Adaptive Multi-Rate
AR All-pole filter
ANT Antenna
CN Comfort Noise
CNB Comfort Noise Buffer
CNC Comfort Noise Coder
DTX Discontinuous Transmission
DPLX Duplex Filter
HO HangOver
EVRC Enhanced Variable Rate Codec
NB Narrow Band
PVD Primary Voice Detector
RX Reception branch
VAD Voice Activity Detector
VAF Voice Activity Factor

DETAILED DESCRIPTION

The basic idea of this invention is the introduction of a new feature in the form of the short term activity measure of the decisions of the primary voice detector. This feature alone can be used for reliable detection of music like input signals as described in connection with FIG. 2.

Figure 1:
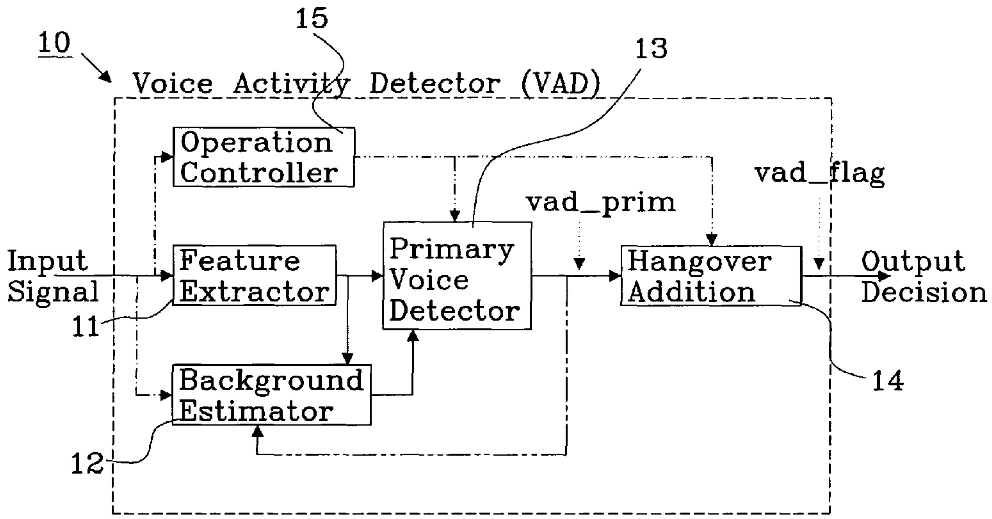
Fig. 1 (Prior Art)
FIG. 1 illustrates a generalized prior art VAD.
Figure 2:
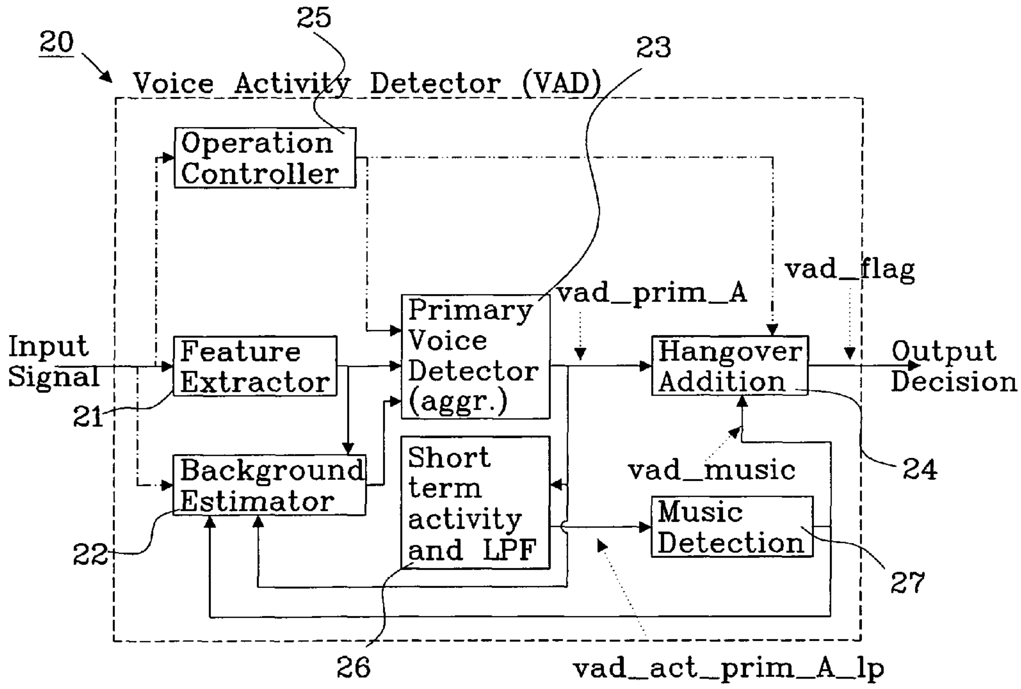
FIG. 2 shows a first embodiment of a VAD having one primary voice detector and a short term voice activity detector according to the present invention.

FIG. 2 shows a first embodiment of a VAD 20 comprising similar function blocks as the VAD described in connection with FIG. 1, such as a feature extractor 21, a background estimator 22, a one primary voice detector (PVD) 23, a hangover addition block 24, and an operation controller 25. The VAD 20 further comprises a short term voice activity detector 26 and a music detector 27.

An input signal is received in the feature extractor 21 and a primary decision "vad_prim_A" is made by the PVD 23, by comparing the feature for the current frame (extracted in the feature extractor 21) and the background feature (estimated from previous input frames in the background estimator 22). A difference larger than a threshold causes an active primary decision "vad_prim_A". A hangover addition block 24 is used to extend the primary decision based on past primary decisions to form the final decision "vad_flag". The short term voice activity detector 26 is configured to produce a short term primary activity signal "vad_act_prim_A" proportional to the presence of music in the input signal based on the primary speech decision produced by the PVD 23.

The primary voice detector 23 is provided with a short term memory in which "k" previous primary speech decisions "vad_prim_A" are stored. The short term activity detector 26 is provided with a calculating device configured to calculate the short term primary activity signal based on the content of the memory and current primary speech decision.

$$\text{vad\_act\_prim\_A} = \frac{m_{memory+current}}{k+1}$$

where vad_act_prim_A is the short term primary activity signal, $m_{memory+current}$ is the number of active decisions in the memory and current primary speech decision, and k is the number of previous primary speech decisions stored in the memory.

The short term voice activity detector is preferably provided with a lowpass filter to further smooth the signal, whereby a lowpass filtered short term primary activity signal "vad_act_prim_A_lp" is produced. The music detector 27 is configured to produce a music decision "vad_music" indicative of the presence of music in the input signal based on the short term primary activity signal "vad_act_prim_A", which may be lowpass filtered or not, by applying a threshold to the short term primary activity signal.

In FIG. 2 "vad_music" is provided both to the hangover addition block 24 to further improve the VAD by detecting music in the input signal, and to the background estimator 22 to affect the update speed (or step size) for background estimation. However, "vad_music" may be used only for improving music detection in the hangover addition block 22 or for improving background estimation in the background estimator 24.

The inventive feature may also be extended if the system is equipped with two primary voice activity detectors, one is aggressive and the other is sensitive, as described in connection with FIG. 3. If both the primary VADs are equipped with the new short term activity feature a large difference in short term primary activity between the two can be used as a warning that caution should be used in updating the background noise. Note that only the aggressive primary VAD is used to make the voice activity decision which will result in a reduction in the excessive activity cause by complex backgrounds, for example babble.

Figure 3:
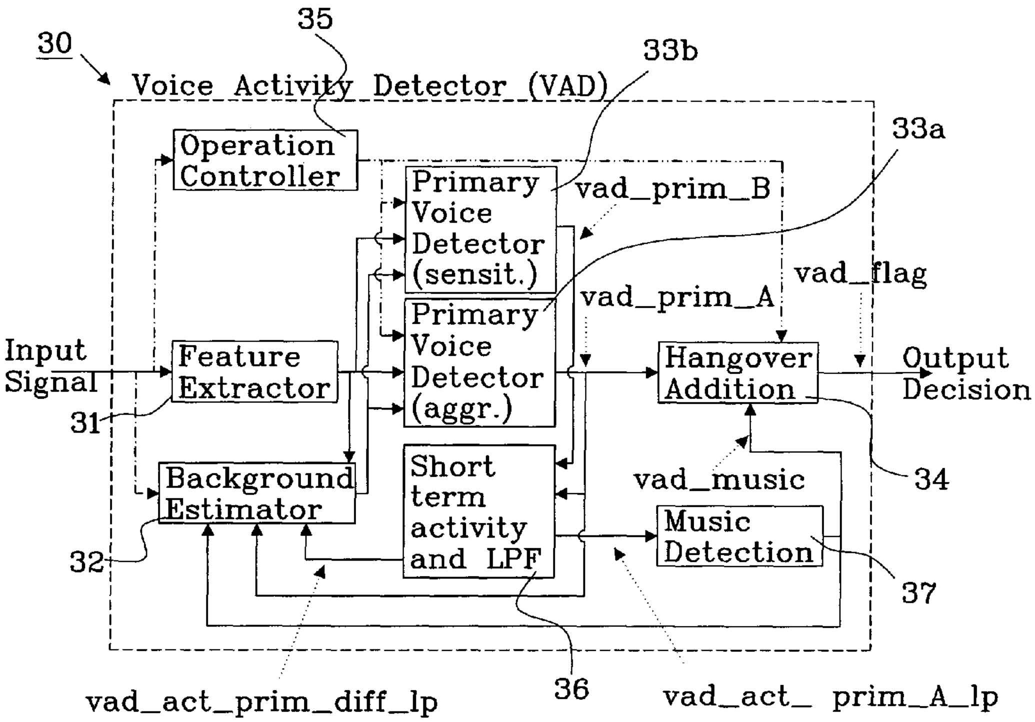
FIG. 3 shows a second embodiment of a VAD having two primary voice detectors and a short term voice activity detector according to the present invention.

FIG. 3 shows a second embodiment of a VAD 30 comprising similar function blocks as the VAD described in connection with FIG. 2, such as a feature extractor 31, a background estimator 32, a first primary voice detector (PVD) 33*a*, a hangover addition block 34, an operation controller 35, a short term voice activity detector 36 and a music detector 37. The VAD 20 further comprises a second PVD 33*b*. The first PVD is aggressive and the second PVD is sensitive.

Figure 4:
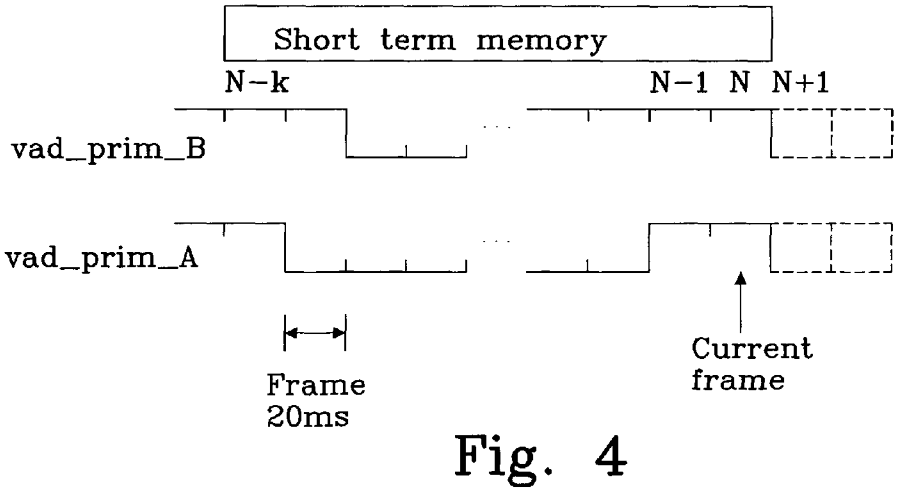
FIG. 4 shows a comparison of primary decisions for the VAD of FIG. 3.

While it would be possible to use completely different techniques for the two primary voice detectors it is more reasonable, from a complexity point of view, to use just one basic primary voice detector but to allow it to operate at a different operation points (e.g. two different thresholds or two different significance thresholds as described in the co-pending International patent application PCT/SE2007/000118 assigned to the same applicant, see reference [11]). This would also guarantee that the sensitive detector always produces a higher activity than the aggressive detector and that the "vad_prim_A" is a subset of "vad_prim_B" as illustrated in FIG. 4.

An input signal is received in the feature extractor 31 and primary decisions "vad_prim_A" and "vad_prim_B" are made by the first PVD 33*a* and the second PVD 33*b*, respectively, by comparing the feature for the current frame (extracted in the feature extractor 31) and the background feature (estimated from previous input frames in the background estimator 32). A difference larger than a threshold in the first PVD and second PVD causes active primary decisions "vad_prim_A" and "vad_primB" from the first PVD 33*a* and the second PVD 33*b*, respectively. A hangover addition block 34 is used to extend the primary decision "vad_prim_A" based on past primary decisions made by the first PVD 33*a* to form the final decision "vad_flag".

The short term voice activity detector 36 is configured to produce a short term primary activity signal "vad_act_prim_A" proportional to the presence of music in the input signal based on the primary speech decision produced by the first PVD 33*a*, and to produce an additional short term primary activity signal "vad_act_prim_B" proportional to the presence of music in the input signal based on the primary speech decision produced by the second PVD 33*a*.

The first PVD 33*a* and the second PVD 33*b* are each provided with a short term memory in which "k" previous primary speech decisions "vad_prim_A" and "vad_prim_B", respectively, are stored. The short term activity detector 36 is provided with a calculating device configured to calculate the short term primary activity signal "vad_act_prim_A" based on the content of the memory and current primary speech decision of the first PVD 33*a*. The music detector 37 is configured to produce a music decision "vad_music" indicative of the presence of music in the input signal based on the short term primary activity signal "vad_act_prim_A", which may be lowpass filtered or not, by applying a threshold to the short term primary activity signal.

In FIG. 3 "vad_music" is provided both to the hangover addition block 34 to further improve the VAD by detecting music in the input signal, and to the background estimator 32 to affect the update speed (or step size) for background estimation. However, "vad_music" may be used only for improving music detection in the hangover addition block 32 or for improving background estimation in the background estimator 34.

The short term memories (one for vad_prim_A and one for vad_prim_B) keeps track of the "k" previous PVD decisions and allows the short term activity of vad_prim_A for the current frame to be calculated as:

$$\text{vad\_act\_prim\_A} = \frac{m_{memory+current}}{k+1}$$

where vad_act_prim_A is the short term primary activity signal, $m_{memory+current}$ is the number of active decisions in the memory and current primary speech decision, and k is the number of previous primary speech decisions stored in the memory.

To smooth the signal further a simple AR filter is used $$vad\_act\_prim\_A\_lp=(1-\alpha)\cdot vad\_act\_prim\_A\_lp+\alpha\cdot vad\_act\_prim\_A$$

where α is a constant in the range 0-1.0 (preferably in the range 0.005-0.1 to archive a significant low pass filtering effect).

The calculations of vad_act_prim_B and vad_act_prim_lp are done in an analogues way.

The short term voice activity detector 36 is further configured to produce a difference signal "vad_act_prim_diff_lp" based on the difference in activity of the first primary detector 33*a* and the second primary detector 33*b*, an the background estimator 32 is configured to estimate background based on feedback of primary speech decisions "vad_prim_A" from the first vice detector 33*a* and the difference signal "vad_act_prim_diff_lp" from the short term activity detector 36. With these variables it is possible to calculate an estimate of the difference in activity for the two primary detectors as:

$$vad\_act\_prim\_diff\_lp=vad\_act\_prim\_B\_lp-vad\_act\_prim\_A\_lp$$

The result is the two new features which are:

vad_act_prim_A_lp short term activity of the aggressive VAD vad_act_prim_diff_lp difference in activity of the two VADs These features are then used to:

Make reliable music detection which activates music hangover addition.

Improved noise update which allows for more reliable operation when using an aggressive VAD, where the aggressive VAD is used to reduce the amount of excessive activity in babble and other non-stationary backgrounds. (Especially the improved noise update may be less aggressive for music conditions)

FIG. 4 shows a comparison of primary decisions for the first PVD 33*a* and the second PVD 33*b*. For each PVD a primary decision "vad_prim_A" and "vad_prim_B", respectively, is made for each frame of the input signal. The short term memory for each PVD is illustrated, each containing the primary decision of the current frame "N" and the previous "k" number of primary decisions. As a non-limiting example, "k" is selected to be 31.

Example of Music Detection for Reliable Music Hangover Addition

This example is based on the AMR-NB VAD, as described in reference [1], with the extension to use significance thresholds to adjust the aggressiveness of the VAD.

Speech consists of a mixture of voiced (vowels such as "a", "o") and unvoiced speech (consonants such as "s") which are combined to syllables. It is therefore highly unlikely that continuous speech causes high short term activity in the primary voice activity detector, which has a much easier job detecting the voiced segments compared to the unvoiced.

The music detection in this case is achieved by applying a threshold to the short term primary activity.

```
if vad__act__prim__A__lp > ACT__MUSIC__THRESHOLD then
      Music__detect = 1;
else
      Music__detect= 0;
end
```

The threshold for music detection should be high enough not to mistakenly classify speech as music, and has to be tuned according to the primary detector used. Note that also the low-pass filter used for smoothing the feature may require tuning depending on the desired result.

Example of Improved Background Noise Update

For a VAD that uses decision feed back to update the background noise level the use of an aggressive VAD may result in unwanted noise update. This effect can be reduced with the use of the new feature vad_act_prim_diff_lp.

The feature compares the difference in short term activity of the aggressive and the sensitive primary voice detectors (PVDs) and allows the use of a threshold to indicate when it may be needed to stop the background noise update.

```
if (vad__act__prim__diff__lp > ACT__DIFF__WARNING) then
      act__diff__warning = 1
else
      act__diff__warning = 0
end
```

Here the threshold controls the operation point of the noise update, setting it to 0 will result in a noise update characteristics similar to the one achieved if only the sensitive PVD. While a large values will result in a noise update characteristics similar to the one achieved if only the aggressive PVD is used. It therefore has to be tuned according to the desired performance and the used PVDs.

This procedure of using the difference in short term activity, especially improves the VAD background noise update for music input signal conditions.

The present invention may be implemented in C-code by modifying the source code for AMR NB TS 26.073 ver 7.0.0, described in reference [9], by the following changes:

Changes in the File "vad1.h"

Add the following lines at line 32:

```
/* significance thresholds */
 /* Original value */
 #define SIG__0      0
 /* Optimized value */
 #define SIG__THR__OPT (Word16) 1331
 /* Floor value */
 #define SIG__FLOOR__05 (Word16) 256
 /* Activity difference threshold */
 #define ACT__DIFF__THR__OPT (Word16) 7209
/* short term activity lp /
 #define CVAD__ADAPT__ACT (Word16) (( 1.0 - 0.995) * MAX__16)
/* Activity threshold for extended hangover */
 #define CVAD__ACT__HANG__THR (Word16) (0.85 * MAX__16)
```

Add the following lines at line 77:

```
Word32 vadreg32;          /* 32 bits vadreg     */
Word16 vadcnt32;          /* number of ones in vadreg32 */
Word16 vadact32__lp;       /* lp filtered short term activity */
```

-continued

```
Word16 vad1prim;          /* Primary decision for VAD1   */
Word32 vad1reg32;          /* 32 bits vadreg for VAD1    */
Word16 vad1cnt32;          /* number of ones in vadreg32 for VAD1*/
Word16 vad1act32__lp;      /* lp filtered short term activity for VAD1    */
Word16 lowpowreg;          /* History of low power flag */
```

Changes in the File "vad1.c"

Modify lines 435-442 as indicated below:

```
Before the change:
      if (low__power != 0)
      {
            st->burst__count = 0;                    move16 ( );
            st->hang__count = 0;                     move16 ( );
            st->complex__hang__count = 0;            move16 ( );
            st->complex__hang__timer = 0;            move16 ( );
            return 0;
      }
After the change:
      if (low__power != 0)
      {
            st->burst__count = 0;                    move16 ( );
            st->hang__count = 0;                     move16 ( );
            st->complex__hang__count = 0;            move16 ( );
            /* Require four in a row to stop long hangover */
            test( );logic16( );
            if (st->lowpowreg & 0x7800 ) {
                  st->complex__hang__timer = 0;       move16 ( );
      }
      return 0;
}
```

Modify lines 521-544 as indicated below:

```
Before the change:
      logic16 ( ); test ( ); logic16 ( ); test ( ); test ( );
      if (((0x7800 & st->vadreg) == 0) &&
            ((st->pitch & 0x7800) == 0)
            &&    (st->complex__hang__count == 0))
      {
            alpha__up = ALPHA__UP1;                    move16 ( );
            alpha__down = ALPHA__DOWN1;                move16 ( );
      }
      else
      {
            test ( ); test ( );
            if ((st->stat__count == 0)
                  && (st->complex__hang__count == 0))
            {
                  alpha__up = ALPHA__UP2;              move16 ( );
                  alpha__down = ALPHA__DOWN2;          move16 ( );
            }
            else
            {
                  alpha__up = 0;                       move16 ( );
                  alpha__down = ALPHA3;                move16 ( );
                  bckr__add = 0;                       move16 ( );
            }
      }
After the change:
      logic16 ( ); test ( ); logic16 ( ); test ( ); test ( );
      if (((0x7800 & st->vadreg) == 0) &&
            ((st->pitch & 0x7800) == 0)
            && (st->complex__warning == 0 )
            &&    (st->complex__hang__count == 0))
```

-continued

```
{
    alpha__up = ALPHA__UP1;                    move16 ( );
    alpha__down = ALPHA__DOWN1;                move16 ( );
}
else
{
    test ( ); test ( );
    if ((st->stat__count == 0)
            && (st->complex__warning == 0 )
        && (st->complex__hang__count == 0))
    {
        alpha__up = ALPHA__UP2;                move16 ( );
        alpha__down = ALPHA__DOWN2;            move16 ( );
    }
    else
{
        if((st->stat__count == 0) &&
            (st->complex__warning == 0)) {
            alpha__up = 0;                     move16 ( );
            alpha__down = ALPHA__DOWN2;        move16 ( );
            bckr__add = 1;                     move16 ( );
        }
        else {
            alpha__up = 0;                     move16 ( );
            alpha__down = ALPHA3;              move16 ( );
            bckr__add = 0;                     move16 ( );
        }
    }
}
```

Add the flowing lines at line 645:

```
/* Keep track of number of ones in vadreg32 and short term act */
logic32 ( ); test ( );
if (st->vadreg32&0x00000001 ) {
    st->vadcnt32 = sub(st->vadcnt32,1);                move16( );
}
st->vadreg32 = L__shr(st->vadreg32,1);                 move32( );
test( );
if (low__power == 0) {
    logic16 ( ); test ( );
    if (st->vadreg&0x4000) {
        st->vadreg32 = st->vadreq32 | 0x40000000; logic32( );   move32( );
        st->vadcnt32 = add(st->vadcnt32,1);                     move16( );
    }
}
/* Keep track of number of ones in vad1reg32 and short term act */
logic32 ( ); test ( );
if (st->vad1reg32&0x00000001 ) {
    st->vad1cnt32 = sub(st->vad1cnt32,1);              move16 ( );
}
st->vad1reg32 = L__shr(st->vad1reg32,1);               move32 ( );
test( );
if (low__power == 0) {
    test( );
    if (st->vad1prim) {
        st->vad1reg32 = st->vad1reg32 | 0x40000000; logic32( );   move32( );
        st->vad1cnt32 = add(st->vad1cnt32,1);                    move16( );
    }
}
/* update short term activity for aggressive primary VAD */
st->vadact32__lp = add(st->vadact32__lp,
                        mult__r(CVAD__ADAPT__ACT,
                                sub(shl(st->vadcnt32,10),
                                    st->vadact32__lp)));
/* update short term activity for sensitive primary VAD */
st->vad1act32__lp = add(st->vad1act32__lp,
                        mult__r(CVAD__ADAPT__ACT,
                                sub(shl(st->vad1cnt32,10),
                                    st->vad1act32__lp)));
```

Modify lines 678-687 as indicated below:

```
Before the change:
    test ( );
    if (sub(st->corr__hp__fast, CVAD__THRESH__HANG) > 0)
    {
        st->complex__hang__timer =                     move16 ( );
        add(st->complex__hang__timer, 1);
    }
    else
    {
        st->complex__hang__timer = 0;                  move16 ( );
    }
After the change:
    /* Also test for activity in complex and increase hang time */
    test ( ); logic16( ); test( );
    if ((sub(st->vadact32__lp, CVAD__ACT__HANG__THR) >0) ||
        (sub(st->corr__hp__fast, CVAD__THRESH__HANG) > 0))
    {
        st->complex__hang__timer =                     move16 ( );
        add(st->complex__hang__timer, 1);
    }
    else
    {
        st->complex__hang__timer = 0;                  move16 ( );
    }
    test( );
    if (sub(sub(st->vad1act32__lp,st->vadact32__lp),
            ACT__DIFF__THR__OPT) >0)
    {
```

```
    st->complex__low = st->complex__low | 0x4000; logic16 ( );
  move16 ( );
  }
```

Modify lines 710-710 as indicated below:

```
Before the change:
  Word16 i;
  Word16 snr__sum;
  Word32 L__temp;
  Word16 vad__thr, temp, noise__level;
  Word16 low__power__flag;
  /*
    Calculate squared sum of the input levels (level)
    divided by the background noise components (bckr__est).
    */
  L__temp = 0;                         move32( );
After the change:
  Word16 i;
  Word16 snr__sum;          /* Used for aggressive main vad */
  Word16 snr__sum__vad1;    /* Used for sensitive vad */
  Word32 L__temp;
  Word32 L__temp__vad1;
  Word16 vad__thr, temp, noise__level;
  Word16 low__power__flag;
  /*
    Calculate squared sum of the input levels (level)
    divided by the background noise components (bckr__est).
    */
  L__temp = 0;                         move32( );
  L__temp__vadl = 0;                   move32( );
```

Modify lines 721-732 as indicated below:

```
Before the change:
  for (i = 0; i < COMPLEN; i++)
  {
    Word16 exp;
    exp = norm__s(st->bckr__est[i]);
    temp = shl(st->bckr__est[i], exp);
    temp = div__s(shr(level[i], 1), temp);
    temp = shl(temp, sub(exp, UNIRSHFT−1));
    L__temp = L__mac(L__temp, temp, temp);
  }
  snr__sum = extract__h(L__shl(L__temp, 6));
  snr__sum = mult(snr__sum, INV__COMPLEN);
After the change:
  for (i = 0; i < COMPLEN; i++)
  {
    Word16 exp;
    exp = norm__s(st->bckr__est[i]);
    temp = shl(st->bckr__est[i], exp);
    temp = div__s(shr(level[i], 1), temp);
    temp = shl(temp, sub(exp, UNIRSHFT−1));
    /* Also calc ordinary snr__sum -- Sensitive */
    L__temp__vad1 = L__mac(L__temp__vad1,temp, temp);
    /* run core sig__thresh adaptive VAD -- Aggressive */
    if (temp > SIG__THR__OPT) {
        /* definitely include this band */
        L__temp = L__mac(L__temp, temp, temp);
    } else {
        /*reduced this band*/
        if (temp > SIG__FLOOR__05) {
          /* include this band with a floor value */
          L__temp = L__mac(L__temp,SIG__FLOOR__05,
          SIG__FLOOR__05);
        }
        else {
          /* include low band with the current value */
          L__temp = L__mac(L__temp, temp, temp);
        }
    }
  }
```

```
    snr__sum = extract__h(L__shl(L__temp, 6));
    snr__sum = mult(snr__sum, INV__COMPLEN);
    snr__sum__vad1 = extract__h(L__shl(L__temp__vad1, 6));
    snr__sum__vad1 = mult(snr__sum__vad1, INV__COMPLEN);
```

Add the flowing lines at line 754:

```
  /* Shift low power register */
  st->lowpowreg = shr(st->lowpowreg,1);            move16 ( );
```

Add the flowing lines at line 762:

```
  /* Also make intermediate VAD1 decision */
  st->vad1prim=0;                                  move16 ( );
  test ( );
  if (sub(snr__sum__vad1, vad__thr) > 0)
    {
      st->vad1prim = 1;                            move16 ( );
    }
  /* primary vad1 decsion made */
```

Modify lines 763-772 as indicated below:

```
Before the change:
  /* check if the input power (pow__sum) is lower than a threshold" */
  test ( );
  if (L__sub(pow__sum, VAD__POW__LOW) < 0)
  {
    low__power__flag = 1;                          move16 ( );
  }
  else
  {
    low__power__flag = 0;                          move16 ( );
  }
After the change:
  /* check if the input power (pow__sum) is lower than a threshold" */
  test ( );
  if (L__sub(pow__sum, VAD__POW__LOW) < 0)
  {
    low__power__flag = 1;                          move16 ( );
    st->lowpowreg = st->lowpowreg | 0x4000; logic16 ( ); move16 ( );
  }
  else
  {
    low__power__flag = 0;                          move16 ( );
  }
```

Modify line 853 as indicated below:

```
Before the change:
  state->vadreg = 0;
  state->vadreg = 0;
After the change:
  state->vadreg32 = 0;
  state->vadcnt32 = 0;
  state->vad1reg32 = 0;
  state->vad1cnt32 = 0;
  state->lowpowreg = 0;
  state->vadact32__lp =0;
  state->vad1act32__lp =0;
```

Changes in the File "cod_amr.c"
Add the flowing lines at line 375:

```
dtx__noise__burst__warning(st->dtx__encSt);
```

Changes in the File "dtx_enc.h"
Add the flowing lines at line 37:

```
#define DTX__BURST__THR 250
#define DTX__BURST__HO__EXT 1
#define DTX__MAXMIN__THR 80
#define DTX__MAX__HO__EXT__CNT 4
#define DTX__LP__AR__COEFF (Word16)
((1.0 - 0.95) * MAX__16) /* low pass filter */
```

Add the flowing lines at line 54:

```
/* Needed for modifications of VAD1 */
Word16 dtxBurstWarning;
Word16 dtxMaxMinDiff;
Word16 dtxLastMaxMinDiff;
Word16 dtxAvgLogEn;
Word16 dtxLastAvgLogEn;
Word16 dtxHoExtCnt;
```

Add the flowing lines at line 139:

```
/*
***********************************************************
*
*     Function        :  dtx__noise__burst__warning
*     Purpose         :  Analyses frame energies and provides a warning
*                        that is used for DTX hangover extension
*     Return value    :  DTX burst warning, 1 = warning, 0 = noise
*
************************************************************/
void dtx__noise__burst__warning(dtx__encState *st); /* i/o : State struct */
```

Changes in the File "dtx_enc.c"
Add the flowing lines at line 119:

```
>   st->dtxBurstWarning = 0;
>   st->dtxHoExtCnt = 0;
```

Add the flowing lines at line 339:

```
>       st->dtxHoExtCnt = 0;                    move16( );
```

Add the flowing lines at line 348:

```
>         /* 8 Consecutive VAD==0 frames save
>               Background MaxMin diff and Avg Log En */
>         st->dtxLastMaxMinDiff =
>            add(st->dtxLastMaxMinDiff,
>                  mult__r(DTX__LP__AR__COEFF,
>                        sub(st->dtxMaxMinDiff,
>                              st->dtxLastMaxMinDiff)));       move16( );
>
```

-continued

```
>         st->dtxLastAvgLogEn = st->dtxAvgLogEn;          move16( );
```

Modify lines 355-367 as indicated below:

```
Before change:
        test ( );
        if (sub(add(st->decAnaElapsedCount, st->dtxHangoverCount),
                DTX__ELAPSED__FRAMES__THRESH) < 0)
        {
          *usedMode = MRDTX;                              move16( );
          /* if short time since decoder update, do not add extra HO */
        }
        /*
          else
          override VAD and stay in
          speech mode *usedMode
          and add extra hangover
        */
After change:
        test ( );
        if (sub(add(st->decAnaElapsedCount, st->dtxHangoverCount),
                DTX__ELAPSED__FRAMES__THRESH) < 0)
        {
          *usedMode = MRDTX;                              move16( );
          /* if short time since decoder update, do not add extra HO */
        }
           else
           {
             /*
             else
             override VAD and stay in
             speech mode *usedMode
             and add extra hangover
           */
           if (*usedMode != MRDTX)
           {
             /* Allow for extension of HO if
                    energy is dropping or
                    variance is high */
             test( );
             if (st->dtxHangoverCount==0)
             {
               test( );
               if (st->dtxBurstWarning!=0)
                     {
                       test( );
                       if (sub(DTX__MAX__HO__EXT__CNT,
                              st->dtxHoExtCnt)>0)
                         {
                           st->dtxHangover-                move16( );
                           Count=DTX__BURST__HO__EXT;
                           st->dtxHoExtCnt = add(st->dtxHoExtCnt,1);
                         }
                     }
             }
             /* Reset counter at end of hangover for reliable stats */
             test( );
             if (st->dtxHangoverCount==0) {
               st->dtxHoExtCnt = 0;                        move16( );
             }
           }
        }
```

Add the flowing lines at line 372:

```
/*****************************************************************************
*
*       Function        :  dtx__noise__burst__warning
*       Purpose         :  Analyses frame energies and provides a warning
*                          that is used for DTX hangover extension
*       Return value    :  DTX burst warning, 1 = warning, 0 = noise
*
*****************************************************************************/
void dtx__noise__burst__warning(dtx__encState *st        /* i/o : State struct
*/
                    )
{
   Word16 tmp__hist__ptr;
   Word16 tmp__max__log__en;
   Word16 tmp__min__log__en;
   Word16 first__half__en;
   Word16 second__half__en;
   Word16 i;
   /* Test for stable energy in frame energy buffer */
   /* Used to extend DTX hangover */
   tmp__hist__ptr = st->hist__ptr;                                move16( );
   /* Calc energy for first half */
   first__half__en =0;                                            move16( );
   for(i=0;i<4;i++) {
      /* update pointer to circular buffer         */
      tmp__hist__ptr = add(tmp__hist__ptr, 1);
      test( );
      if (sub(tmp__hist__ptr, DTX__HIST__SIZE) == 0){
         tmp__hist__ptr = 0;                                      move16( );
      }
      first__half__en = add(first__half__en,
                        shr(st->log__en__hist[tmp__hist__ptr],1));
   }
   first__half__en = shr(first__half__en,1);
   /* Calc energy for second half */
   second__half__en =0;                                           move16( );
   for(i=0;i<4;i++) {
      /* update pointer to circular buffer         */
      tmp__hist__ptr = add(tmp__hist__ptr, 1);
      test( );
      if (sub(tmp__hist__ptr, DTX__HIST__SIZE) == 0){
         tmp__hist__ptr = 0;                                      move16( );
      }
      second__half__en = add(second__half__en,
                        shr(st->log__en__hist[tmp__hist__ptr],1));
   }
   second__half__en = shr(second__half__en,1);
   tmp__hist__ptr = st->hist__ptr;                                move16( );
   tmp__max__log__en = st->log__en__hist[tmp__hist__ptr];         move16( );
   tmp__min__log__en = tmp__max__log__en;                         move16( );
   for(i=0;i<8;i++) {
      tmp__hist__ptr = add(tmp__hist__ptr,1);
      test( );
      if (sub(tmp__hist__ptr, DTX__HIST__SIZE) ==0) {
         tmp__hist__ptr = 0;                                      move16( );
      }
      test( );
      if (sub(st->log__en__hist[tmp__hist__ptr],tmp__max__log__en)>=0) {
         tmp__max__log__en = st->log__en__hist[tmp__hist__ptr];   move16( );
      }
      else {
         test( );
         if (sub(tmp__min__log__en,st->log__en__hist[tmp__hist__ptr]>0)) {
               tmp__min__log__en = st->log__en__hist[tmp__hist__ptr];   move16( );
         }
      }
   }
   st->dtxMaxMinDiff = sub(tmp__max__log__en,tmp__min__log__en);   move16( );
   st->dtxAvgLogEn = add(shr(first__half__en,1),
                        shr(second__half__en,1));                 move16( );
   /* Replace max with min */
   st->dtxAvgLogEn = add(sub(st->dtxAvgLogEn,shr(tmp__max__log__en,3)),
                        shr(tmp__min__log__en,3));                move16( );
   test( ); test( ); test( ); test( );
   st->dtxBurstWarning =
      (/* Majority decision on hangover extension */
       /* Not decreasing energy */
       add(
```

-continued

```
            add(
                (sub(first_half_en,add(second_half_en,DTX_BURST_THR))>0),
                /* Not Higer MaxMin differance */
                (sub(st->dtxMaxMinDiff,
                        add(st->dtxLastMaxMinDiff,DTX_MAXMIN_THR))>0)),
                /* Not higher average energy */
            shl((sub(st->dtxAvgLogEn,add(add(st->dtxLastAvgLogEn,
                            shr(st-
>dtxLastMaxMinDiff,2)),
                        shl(st-
>dtxHoExtCnt,4)))>0),1)))>=2;
}
```

The modified c-code uses the following names on the above defined variables:

| Name in Description | Name in c-code |
|---|---|
| vad_act_prim_A | vadact32 |
| vad_act_prim_B | vad1act32 |
| vad_act_prim_A_lp | vadact32_lp |
| vad_act_prim_B_lp | vad1act32_lp |
| vad_act_prim_diff_lp | vad1act32_lp-vadact32_lp |
| ACT_MUSIC_THRESHOLD | CVAD_ACT_HANG_THR |
| ACT_DIFF_WARNING | ACT_DIFF_THR_OPT |

Where:
CVAD_ACT_HANG_THR = 0.85
ACT_DIFF_THE_OPT = 7209 (i.e. 0.22)
SIG_THR_OPT = 1331 (i.e. 2.6)
SIG_FLOOR = 256 (i.e. 0.5)
were found to work best.

The main program for the coder is located in coder.c which calls cod_amr in amr_enc.c which in turn calls vad1 which contains the most relevant functions in the c-code.

vad1 is defined in vad1.c which also calls (directly or indirectly): vad_decison, complex_vad, noise_estimate_update, and complex_estimate_update all of which are defined in vad1.c cnst_vad.h contains some VAD related constants vad1.h defines the prototypes for the functions defined in vad1.c.

The calculation and updating of the short term activity features are made in the function complex_estimate_adapt in vad1.c In the C-code the improved music detector is used to control the addition of the complex hangover addition, which is enabled if a sufficient number of consecutive frames have an active music detector (Music_detect=1). See the function hangover_addition for details.

In the C-code the modified background update allows large enough differences in primary activity to affect the noise update through the st→complex_warning variable in the function noise_estimate_update.

These results only show the gain of the combined solutions (Improved music detector and modified background noise update); however significant gains may be obtained from the separate solutions.

A summary of the result can be found in FIG. 4*a* in the drawings, where VADR is equivalent to the AMR VAD1 [1]. VADL is the optimized/evaluated VAD with the significance threshold [2.6] and the activity difference threshold [0.22]). Also the abbreviations DSM and MSIN are filters applied to the input signal before coding these are defined in the ITU G.191 [10].

The results show the performance of the different codec for some different input signals. The results are shown in the form of DTX activity, which is the amount of speech coded frames (but it also includes the activity added by the DTX hangover system see [1] and references therein for details). The top part of the table shows the results for speech with different amount of white background noise. In this case the VADL shows a slightly higher activity only for the clean speech case (where no noise is added), this should reduce the risk of speech clipping. For increasing amounts of white background noise, VADL efficiency is gradually improved.

The bottom part of the table shows the results for different types of pure music and noise inputs, for two types of signal input filters setups (DSM-MSIN and MSIN). For Music inputs most of the cases show an increase in activity which also indicates a reduced risk of replacing music with comfort noise. For the pure background noise inputs there is a significant improvement in activity since it is desirable from an efficiency point of view to replace most of the Babble and Car background noises with comfort noise. It is also interesting to see that the music detection capability of VADL is maintained even though the efficiency is increased for the background noises (babble/car).

Figure 5:
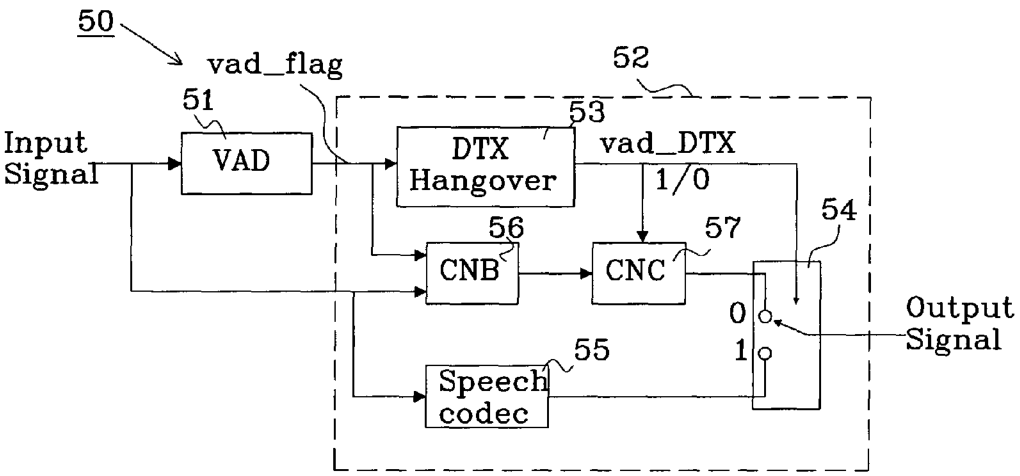
FIG. 5 shows a speech coder including a VAD according to the invention.

FIG. 5 shows a complete encoding system 50 including a voice activity detector VAD 51, preferably designed according to the invention, and a speech coder 52 including Discontinuous Transmission/Comfort Noise (DTX/CN). FIG. 5 shows a simplified speech coder 52, a detailed description can be found in reference [1] and [12]. The VAD 51 receives an input signal and generates a decision "vad_flag". The speech coder 52 comprises a DTX Hangover module 53, which may add seven extra frames to the "vad_flag" received from the VAD 51, for more details see reference [12]. If "vad_DTX"="1" then voice is detected, and if "vad_DTX"="0" then no voice is detected. The "vad_DTX" decision controls a switch 54, which is set in position 0 if "vad_DTX" is "0" and in position 1 if "vad_DTX" is "1".

"vad_flag" is forwarded to a comfort noise buffer (CNB) 56, which keeps track of the latest seven frames in the input signal. This information is forwarded to a comfort noise coder 57 (CNC), which also receive the "vad_DTX" to generate comfort noise during the non-voiced and non-music frames, for more details see reference [1]. The CNC is connected to position 0 in the switch 54.

Figure 6:
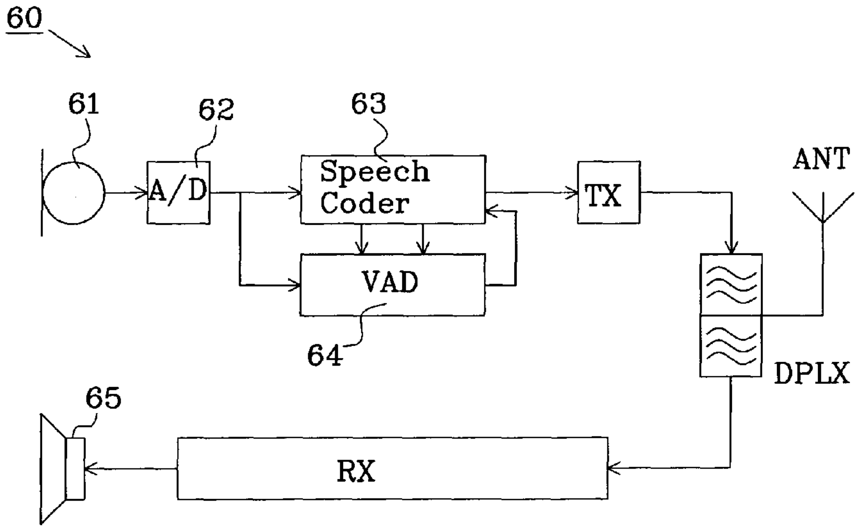
FIG. 6 shows a terminal including a VAD according to the invention.

FIG. 6 shows a user terminal 60 according to the invention. The terminal comprises a microphone 61 connected to an A/D device 62 to convert the analogue signal to a digital signal. The digital signal is fed to a speech coder 63 and VAD 64, as described in connection with FIG. 5. The signal from the speech coder is forwarded to an antenna ANT, via a transmitter TX and a duplex filter DPLX, and transmitted there from. A signal received in the antenna ANT is forwarded to a reception branch RX, via the duplex filter DPLX. The known operations of the reception branch RX are carried out for speech received at reception, and it is repeated through a speaker 65.

REFERENCES

[1] 3GPP, "Adaptive Multi-Rate (AMR) speech codec; Voice Activity Detector (VAD)" 3GPP TS 26.094 V7.0.0 (2006-07)

[2] Vähätalo, "Method and device for voice activity detection, and a communication device", U.S. Pat. No. 5,963,901A1, Nokia, Dec. 10, 1996

[3] Johansson, et. al, "Complex signal activity detection for improved speech/noise classification of an audio signal", U.S. Pat. No. 6,424,938B1, Telefonaktiebolaget L. M. Ericsson, Jul. 23, 2002

[4] 3GPP2, "Enhanced Variable Rate Codec, Speech Service Option 3 for Wideband Spread Spectrum Digital Systems", 3GPP2, C.S0014-A v1.0, 2004-05

[5] De Jaco, "Encoding rate selection in a variable rate vocoder", U.S. Pat. No. 5,742,734_A1, Qualcomm, Aug. 10, 1994

[6] Hong, "Variable hangover time in a voice activity detector", U.S. Pat. No. 5,410,632_A1, Motorola, Dec. 23, 1991

[7] Freeman, "Voice Activity Detection", U.S. Pat. No. 5,276,765_A1, Mar. 10, 1989

[8] Barrett, "Voice activity detector", U.S. Pat. No. 5,749,067_A1, Mar. 8, 1996

[9] 3GPP, "Adaptive Multi-Rate (AMR); ANSI C source code", 3GPP TS 26.073 V7.0.0 (2006-07)

[10] ITU-T, "Software tools for speech and audio coding standardization", ITU-T G.191, September 2005

[11] Sehlstedt, "A voice detector and a method for suppressing sub-bands in a voice detector" PCT/SE2007/000118, Feb. 9, 2007

[12] 3GPP "Adaptive Multi-Rate (AMR) speech codec; Source Control Rate Operation" 3GPP TS 26.093 V7.0.0 (2006-07)

The invention claimed is:

1. A voice activity detector comprising a first primary voice detector;

a feature extractor;

a background estimator, said voice activity detector being configured to output a speech decision (vad_flag) indicative of the presence of speech in an input signal based on at least a primary speech decision (vad_prim_A) produced by said first primary voice detector, the input signal being divided into frames and fed to the feature extractor, said primary speech decision being based on a comparison of a feature extracted in the feature extractor for a current frame of the input signal and a background feature estimated from previous frames of the input signal in the background estimator; said first primary voice detector having a memory in which previous primary speech decisions are stored, said voice activity detector further comprises a short term activity detector, said voice activity detector is further configured to produce a music decision (vad_music) indicative of the presence of music in the input signal based on a short term primary activity signal (αvad_act_prim_A) produced by said short term activity detector based on the primary speech decision produced by the first primary voice detector, said short term primary activity signal is proportional to the presence of music in the input signal, said short term activity detector is provided with a calculating device configured to calculate the short term primary activity signal based on the relationship:

$$\text{vad\_act\_prim\_A} = \frac{m_{memory+current}}{k+1}$$

where vad_act_prim_A is the short term primary activity signal, $m_{memory+current}$ is the number of active decisions in the memory and current primary speech decision, and k is the number of previous primary speech decisions stored in the memory.

2. The voice activity detector according to claim 1, wherein said voice activity detector further comprises a music detector configured to produce the music decision by applying a threshold to the short term primary activity signal.

3. The voice activity detector according to claim 1, wherein said short term activity detector is further provided with a filter to smooth the short term primary activity signal and produce a lowpass filtered short term primary activity signal (vad_act_prim_A_lp).

4. The voice activity detector according to claim 1 further comprising a hangover addition block configured to produce said speech decision based on said primary speech decision, wherein the speech decision further is based on the music decision which is provided to the hangover addition block.

5. The voice activity detector according to claim 1, wherein the background estimator is configured to provide the background feature to at least said first primary voice detector, and wherein the music decision is provided to the background estimator and an update speed/step size of the background feature is based on the music decision.

6. The voice activity detector according to claim 1, wherein the voice activity detector further comprises a second primary voice detector, being more sensitive than said first primary voice detector, said second primary voice detector is configured to produce an additional primary speech decision (vad_prim_B) indicative of the presence of speech in the input signal analogue to the primary speech decision produced by the first primary voice detector, said short term activity detector is configured to produce a difference signal (vad_act_prim_diff_lp) "vad_act_prim_diff_lp" based on the difference in activity of the first primary detector and the second primary detector, the background estimator is configured to estimate background based on feedback of primary speech decisions from the first voice detector and said difference signal from the short term activity detector.

7. The voice activity detector according to claim 6, wherein the background estimator is configured to update background noise based on the difference signal produced by the short term activity detector by applying a threshold to the difference signal.

8. The voice activity detector according to claim 6, wherein the background estimator is configured to update background noise based on the difference signal produced by the short term activity detector by applying a threshold to the difference signal.

9. A method for detecting music in an input signal using a voice activity detector comprising; a first primary voice detector; a feature extractor; a background estimator and a short term activity detector, said method comprising the steps:

feeding an input signal divided into frames to the feature extractor, producing a primary speech decision (vad_prim_A) by the first primary voice detector based on a comparison of a feature extracted in the feature extractor for a current frame of the input signal and a background feature estimated from previous frames of the input signal in the background estimator; and outputting a speech decision (vad_flag) indicative of the presence of speech in the input signal based on at least the primary speech decision "vad_prim_A", producing a short term primary activity signal (αvad_act_prim_A) in the short term activity detector, proportional to the presence of music in the input signal based on the relationship:

$$\text{vad\_act\_prim\_A} = \frac{m_{memory+current}}{k+1}$$

where vad_acCprim_A is the short term primary activity signal, $^{m}$memory+current is the number of active decisions stored in a memory and current primary speech decision, and k is the number of previous primary speech decisions stored in the memory, and producing a music decision (vad_music) indicative of the presence of music in the input signal based on a short term primary activity signal (vad_act_prim_A) produced by said short term activity detector.

10. The method according to claim 9, wherein the voice activity detector further comprises a music detector, said method further comprises producing the music decision, in the music detector, by applying a threshold to the short term primary activity signal.

11. The method according to claim 9, wherein said speech decision is based on the produced music decision.

12. The method according to claim 9, wherein the method further comprises:

providing the background feature to said at least first primary voice detector wherein an update speed/step size of the background feature is based on the produced music decision.

13. A node in a telecommunication system comprising a voice activity detector comprising:

a first primary voice detector;

a feature extractor;

a background estimator, said voice activity detector being configured to output a speech decision (vad_flag) indicative of the presence of speech in an input signal based on at least a primary speech decision (vad_prim_A) produced by said first primary voice detector, the input signal being divided into frames and fed to the feature extractor, said primary speech decision being based on a comparison of a feature extracted in the feature extractor for a current frame of the input signal and a background feature estimated from previous frames of the input signal in the background estimator; said first primary voice detector having a memory in which previous primary speech decisions are stored, said voice activity detector further comprises a short term activity detector, said voice activity detector is further configured to produce a music decision (vad_music) indicative of the presence of music in the input signal based on a short term primary activity signal (αvad_act_prim_A) produced by said short term activity detector based on the primary speech decision produced by the first primary voice detector, said short term primary activity signal is proportional to the presence of music in the input signal, said short term activity detector is provided with a calculating device configured to calculate the short term primary activity signal based on the relationship:

$$\text{vad\_act\_prim\_A} = \frac{m_{memory+current}}{k+1}$$

where vad_act_prim_A is the short term primary activity signal, $^{m}$memory+current is the number of active decisions in the memory and current primary speech decision, and k is the number of previous primary speech decisions stored in the memory.

14. The node according to claim 13, wherein the node is a terminal and the voice activity detector further comprises a music detector configured to produce the music decision by applying a threshold to the short term primary activity signal.

15. The node of claim 13, wherein the short term activity detector is further provided with a filter to smooth the short term primary activity signal and produce a lowpass filtered short term primary activity signal (vad_act_prim_A_lp).

16. The node of claim 13, further comprising a hangover addition block configured to produce said speech decision based on said primary speech decision, wherein the speech decision further is based on the music decision which is provided to the hangover addition block.

17. The node of claim 13, wherein the background estimator is configured to provide the background feature to at least said first primary voice detector, and wherein the music decision is provided to the background estimator and an update speed/step size of the background feature is based on the music decision.

18. The node of claim 13, wherein the voice activity detector further comprises a second primary voice detector, being more sensitive than said first primary voice detector, said second primary voice detector is configured to produce an additional primary speech decision (vad_prim_B) indicative of the presence of speech in the input signal analogue to the primary speech decision produced by the first primary voice detector, said short term activity detector is configured to produce a difference signal (vad_act_prim_diff_lp) based on the difference in activity of the first primary detector and the second primary detector, the background estimator is configured to estimate background based on feedback of primary speech decisions from the first voice detector and said difference signal from the short term activity detector.

* * * * *

UNITED STATES PATENT AND TRADEMARK OFFICE

CERTIFICATE OF CORRECTION

PATENT NO. : 8,321,217 B2
APPLICATION NO. : 12/601253
DATED : November 27, 2012
INVENTOR(S) : Sehlstedt It is certified that error appears in the above-identified patent and that said Letters Patent is hereby corrected as shown below:

Title Page

Item (56), under “OTHER PUBLICATIONS”, in Column 2, Line 1, delete “et al” and insert -- et al., --, therefor.

Item (57), under “ABSTRACT”, in Column 2, Line 11, delete “αvad_act_prim_A’” and insert -- ‘αvad_act_prim_A’ --, therefor.

In the Specification

In Column 2, Line 1, delete “there” and insert -- their --, therefor.

In Column 6, Line 18, delete “vad_act_prim_lp” and insert -- vad_act_prim_B_lp --, therefor.

In Column 6, Line 46, delete “conditions)” and insert -- conditions). --, therefor.

In Column 9, Line 27, delete “flowing” and insert -- following --, therefor at each occurrence throughout the specification.

In Column 12, Line 26, delete “decsion” and insert -- decision --, therefor.

In Column 12, Lines 57-59, delete “ state->vadreg = 0;<br>state->vadreg = 0;<br>After the change: ” and insert -- state->vadreg = 0;<br>After the change:<br>state->vadreg = 0; --, therefor.

In Column 17, Line 3, delete “differance */” and insert -- difference */ --, therefor.

Signed and Sealed this
Fourteenth Day of October, 2014

Michelle K. Lee
*Deputy Director of the United States Patent and Trademark Office*

In Column 17, Line 37, delete “vad_decison,” and insert -- vad_decision, --, therefor.

In Column 17, Line 39, delete “vad1.c” and insert -- vad1.c. --, therefor.

In Column 17, Line 40, delete “constants” and insert -- constants. --, therefor.

In Column 17, Line 45, delete “vad1.c” and insert -- vad1.c. --, therefor.

In Column 17, Line 53, delete “st→complex_warning” and insert -- st->complex_warning --, therefor.

In Column 19, Line 39, delete “(2006-07)” and insert -- (2006-07). --, therefor.

In the Claims

In Column 19, Line 42, in Claim 1, delete “comprising” and insert -- comprising: --, therefor.

In Column 20, Line 44, in Claim 6, delete “(vad_act_prim_diff_lp) “vad_act_prim_diff_lp”” and insert -- (vad_act_prim_diff_lp) --, therefor.

In Column 20, Line 61, in Claim 9, delete “comprising;” and insert -- comprising: --, therefor.

In Column 22, Line 27, in Claim 15, delete “of” and insert -- according to --, therefor each occurrence in claims 16, 17 & 18.